May 13, 1952    H. I. WOLFF    2,596,950
METHOD OF PURIFYING AMMONIUM SULFATE
Filed Sept. 6, 1947
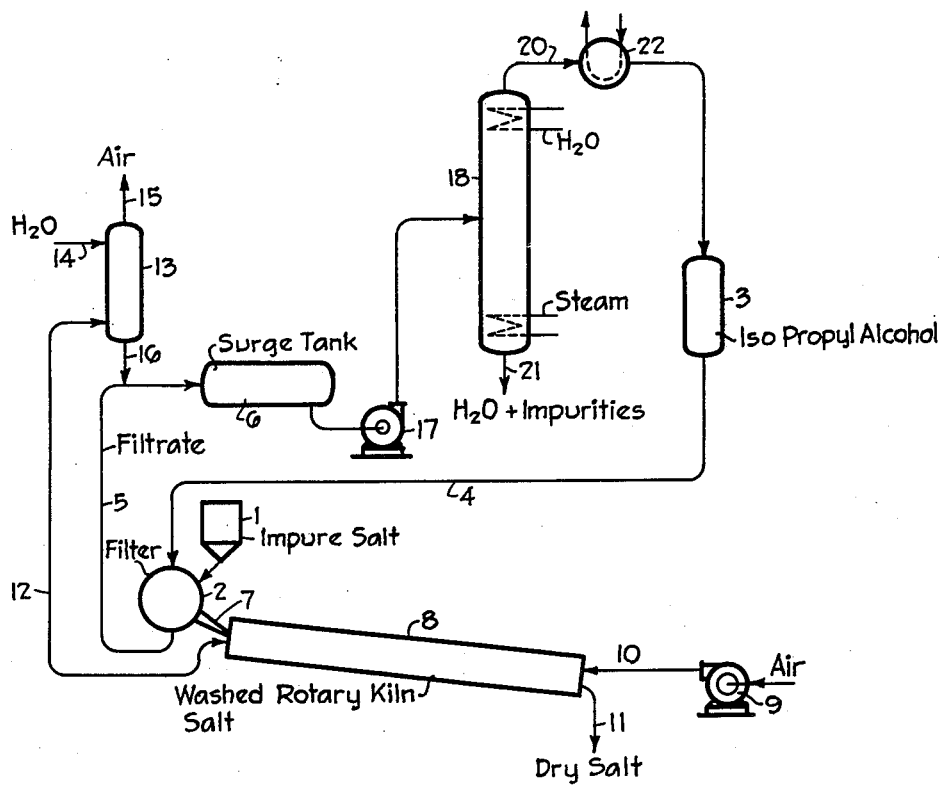
Inventor:
Harold I. Wolff
By Oswald H. Milmore
His Attorney Patented May 13, 1952

2,596,950

UNITED STATES PATENT OFFICE 2,596,950

METHOD OF PURIFYING AMMONIUM SULFATE

Harold I. Wolff, Houston, Tex., assignor to Shell Development Company, San Francisco, Calif., a corporation of Delaware Application September 6, 1947, Serial No. 772,563

11 Claims. (Cl. 23—120)

This process relates to a process of purifying inorganic salts by means of volatile, water-soluble solvents for impurities contained in such salts. It is further concerned with an improved method of removing moisture from such salts.

Salts obtained from raw materials containing impurities frequently contain appreciable amounts of such impurities which render such salts unmarketable for various reasons, such as undesirable color, odor, or hygroscopicity, etc. This is true, for example, in the case of salts obtained by the dry distillation of carbonaceous materials of all kinds, including ammonium chloride, ammonium sulfate, ammonium sulfite, as well as with salts crystallized from an aqueous solution, such as ammonium and alkali metal chlorides, sulfates, sulfites, etc. As a specific example, sodium sulfate, ammonium sulfate and calcium sulfate, produced by the neutralization of waste sulfuric acid obtained from petroleum refineries, such as sludge acid and spent alkylation acid, with ammonia, caustic soda or lime, contain water soluble impurities commonly known as "sticky material" which adheres to the salt upon crystallization. It is not practicable to remove such sticky material with water because of the high water solubility of the salt. As is disclosed in U. S. Patent No. 2,331,235 small amounts, of the order of 0.2% of this sticky material is desirable to produce a free-flowing salt; larger amounts, however, are undesirable and must be removed.

It has heretofore been proposed to purify such inorganic salts by washing them with a suitable solvent for the impurities. Difficulties have, however, been encountered in the recovery of the solvent.

It is an object of the present invention to provide an improved cyclic process for the purification and/or drying of inorganic salts by washing with suitable solvents wherein the solvent carried away from the washing step with the washed salt is recovered, and regenerated together with the solvent in the extract containing in solution the impurities.

It is a further object to provide an improved process for purifying and drying ammonium sulfate which has been produced by the neutralization of spent petroleum refinery sulfuric acid.

Briefly, the present invention involves the steps of washing the wet or dry inorganic salt with a suitable water-soluble, volatile solvent to produce an extract solution containing most of the solvent, having dissolved therein the impurities, and a washed salt residue; recovering the solvent occluded in the washed salt by vaporizing the solvent in a heated gas to produce a mixed vapor containing the gas and the vaporized solvent; separating the vaporized solvent from the gas by water-washing the mixed vapor in a suitable scrubbing tower; combining the resulting aqueous solution of separated solvent with the aforesaid extract solution, and subjecting the combined materials to distillation. In the distillation the impurities are taken off as a bottom product and the regenerated solvent is recovered as a top product, and is then used again for the washing of additional quantities of the salt.

When applied to wet or moist salt, e. g., salt containing from about .5% to 30% of moisture, the process is further advantageous as a drying process and, hence, applicable even when no impurities are to be removed. The affinity of the solvent for the inorganic salt is less than that of water, and, moreover, the solvent is usually more volatile than water; consequently, in one aspect, the process may be regarded as one wherein water is washed out of the salt by means of solvent which is more readily vaporized. In the usual situation, however, the process is applied for the removal of impurities, and in such a case water initially present in the salt is washed out together with the impurities.

The process involves economies in operation and in the quantities of solvent consumed. It is applicable to any inorganic salt, such as those previously named. The particular solvent, of course, will depend upon the nature of the salt being treated and the impurities to be removed therefrom. Thus, various phenols, cresols, ketones and alcohols are suitable.

It was found that ammonium sulfate such as that produced from waste petroleum refinery acid, such as sludge acid and alkylation catalyst acid, and containing the sticky material previously mentioned, is best treated with aliphatic alcohols having less than five carbon atoms or a mixture thereof. Of these, propyl alcohols, either normal propyl or isopropyl alcohol, are preferred. The use of these alcohols for the treatment of ammonium sulfate forms one of the features of this invention, and they may be used to treat also other inorganic salts, including sulfates of alkali metals, etc., whether or not derived from waste refinery acid. Such alcohols are preferably concentrated to at least 80%. For example, their aqueous azeotropic mixtures are suitable.

The process will be described in detail in connection with the drawing forming a part of this specification, the single figure of which is a schematic flow diagram showing the steps as applied to the purification of ammonium sulfate with isopropyl alcohol, it being understood that this particular application is only illustrative of one embodiment of the invention.

Referring to the drawing, ammonium salt crystals containing from 5% to 30% moisture and organic material are fed continuously or intermittently from a hopper 1 to a rotary filter 2. Isopropyl alcohol from a storage tank 3 is fed through line 4 and is passed through the salt on the filter bed, producing an extract solution of the alcohol and dissolved moisture and organic material, sometimes known as sticky material. The extract solution is withdrawn continuously and passed through line 5 to a surge tank 6. The washed salt crystals are passed via a chute 7 to a rotary kiln 8, which may be externally heated by known means, or to which heat may be applied by means of the air stream to be described presently. Air is fed by means of a blower 9 into the lower end of the kiln and flows countercurrently to the wet salt, causing the solvent occluded therewith and remaining moisture to be vaporized. The temperature within the kiln may be varied within wide limits, depending upon the salt being treated, the gas used, the pressure, and the solvent used. When operating with isopropyl alcohol and using air at atmospheric or slightly superatmospheric pressure, a temperature of 65° C. within the kiln was found to be satisfactory. The dried, purified salt is discharged at 11.

The air and vaporized solvent are flowed through a gas line 12 and introduced near the bottom of a scrubbing column 13 into which water is fed at the top at 14. The water may be refrigerated to improve the absorption of the alcohol. Air substantially free from alcohol is vented at 15, while an aqueous solution of alcohol is withdrawn at the bottom via line 16 and combined with the extract solution from the washing operation.

The combined liquids from the surge tank 6 are fed by means of pump 17 to a fractional distillation column 18 which is heated by means of a steam coil at the bottom and is provided with a cooling coil at the top for partial condensation to provide reflux. The top product, withdrawn at 20, consists of a constant boiling mixture of isopropyl alcohol and water; the bottom product, withdrawn at 21, contains water and the sticky material. The vapors are condensed in condenser 22 and fed to the storage tank 3.

By way of example, it is possible to treat 33,300 pounds per hour of ammonium sulfate containing 3% water and 0.3% sticky material in the filter 2, by feeding 10 gallons per minute of 87% isopropyl alcohol from the tank 3. One hundred cubic feet of air per minute are fed through the blower 9 and passed through the kiln 8 at a temperature of 70° C. The hot air discharge from the kiln containing the vaporized alcohol is passed through line 12 into the gas scrubber 13, wherein it is contacted with 1½ gallons per minute of wash water introduced through line 14. The washed air is exhausted through line 15, while the water-alcohol mixture is discharged through line 16 into surge tank 6 where it is then mixed with alcohol that had already contacted the salt in the filter. The mixture of alcohol-water and organic material is then fed to a distillation column 18 in which heat is applied at the bottom of the column for vaporization and reflux is induced by a cooling coil at the top of the column. There is withdrawn at 21 a bottom product containing 1,700 lbs. of water and 100 lbs. of sticky material per hour, while the overhead product is condensed in 22 and recycled through the process through the isopropyl alcohol tank 3.

I claim as my invention:

1. The cyclic process for washing ammonium sulfate salt produced by reacting ammonia with spent petroleum refinery sulfuric acid to remove therefrom organic impurities resulting from said reaction comprising the steps of washing said salt with a volatile solvent which is water-soluble and is a solvent for said organic impurities but is a relatively poor solvent for ammonium sulfate to form an extract solution of the solvent and dissolved impurities and undissolved salt residue, separating the said salt residue from the extract, drying the salt residue in a heated gas to vaporize the solvent to form a mixed vapor containing said gas and the vaporized solvent, washing the mixed vapor with an aqueous solvent to form an aqueous solution containing solvent, combining said solution with the said extract solution, subjecting the combined aqueous solution and extract solution to distillation, withdrawing said solvent as a distillation top product, and returning the distilled solvent for the washing of further quantities of the salt.

2. The process according to claim 1 in which the solvent is an aliphatic hydroxy compound containing less than 5 carbon atoms.

3. The process according to claim 2 in which the solvent is an aliphatic alcohol.

4. A process for washing and drying ammonium sulfate salt produced by reacting ammonia with spent petroleum refinery sulfuric acid to remove therefrom water and organic sticky material resulting from said reaction comprising the steps of washing said salt with a volatile, water-soluble organic solvent for said organic impurities which is a relatively poor solvent for ammonium sulfate to form an extract solution of the solvent, water and sticky material, and leaving an undissolved salt residue, separating the said salt residue from the extract solution, drying the salt residue in a heated gas to vaporize the solvent and any remaining moisture to form a mixed vapor containing said gas and the vaporized solvent, and recovering the vaporized solvent from said mixed vapor.

5. The process according to claim 4 wherein the solvent is an aliphatic alcohol containing less than 4 carbon atoms.

6. The process according to claim 4 wherein the ammonium sulfate containing between about 0.5 and 30% of water and the solvent is an aliphatic alcohol containing less than 4 carbon atoms.

7. The process for the removal of sticky material from ammonium sulfate produced by reacting ammonia with petroleum refinery waste sulfuric acid, said sticky material being organic, water-soluble compounds derived from said waste sulfuric acid, comprising the steps of washing said ammonium sulfate with an aliphatic alcohol having less than five carbon atoms to dissolve said sticky material in the solvent and leave the ammonium sulfate substantially undissolved, and separating the washed ammonium sulfate from the resulting alcoholic solution containing the sticky material.

8. The process according to claim 7 wherein the alcohol contains three carbon atoms.

9. The process according to claim 7 wherein the alcohol is aqueous propyl alcohol having a concentration greater than 80%.

10. The process for the removal of sticky material from ammonium sulfate produced by reacting ammonia with petroleum refinery waste sulfuric acid, said sticky material being organic, water-soluble compounds derived from said waste sulfuric acid, comprising the steps of washing said ammonium sulfate with an aliphatic alcohol having less than five carbon atoms to dissolve said sticky material in the solvent and leave the ammonium sulfate substantially undissolved, separating the washed ammonium sulfate from the resulting alcoholic solution containing the sticky material, distilling the said alcoholic solution, withdrawing from the distillation step as top product the alcohol freed from the dissolved sticky material, and returning the alcohol for the washing of a subsequent quantity of ammonium sulfate.

11. In combination with the process according to claim 10, the steps of drying the washed ammonium sulfate in a current of warm air to vaporize alcohol entrained in the ammonium sulfate, passing the resulting air and alcohol vapors through a scrubbing zone in countercurrent to an aqueous solvent for the alcohol for forming an aqueous solution of recovered alcohol, combining said aqueous solution with the alcoholic solution containing sticky material obtained in the washing step.

HAROLD I. WOLFF.

REFERENCES CITED

The following references are of record in the file of this patent:

UNITED STATES PATENTS

| Number | Name | Date |
|---|---|---|
| 1,346,106 | Bredlik | July 13, 1920 |
| 2,270,184 | Dreisbach | Jan. 13, 1942 |
| 2,321,893 | Bimpson et al. | June 15, 1943 |
| 2,334,015 | Levine et al. | Nov. 9, 1943 |
| 2,410,034 | Luaces | Oct. 29, 1946 |
| 2,418,947 | Lott et al. | Apr. 15, 1947 |
| 2,462,963 | Hartmann et al. | Mar. 1, 1949 |

FOREIGN PATENTS

| Number | Country | Date |
|---|---|---|
| 359,641 | Great Britain | Oct. 29, 1931 |
| 163,162 | Great Britain | May 19, 1921 |

OTHER REFERENCES

Lange, Handbook of Chem. & Phys. (28th Ed.), pp. 344–345.

Gregory, "Uses and Appl. of Chemicals & Related Materials," Reinhold Publ. Co., 1939; pp. 16 and 17.